(12) United States Patent
Megarity et al.

(10) Patent No.: US 7,586,854 B2
(45) Date of Patent: Sep. 8, 2009

(54) DYNAMIC DATA PATH COMPONENT CONFIGURATION APPARATUS AND METHODS

(75) Inventors: Mark R. Megarity, Ottawa (CA); Dion Pike, Stittsville (CA); John Madsen, Ottawa (CA)

(73) Assignee: Alcatel Lucent, Paris (FR)

( * ) Notice: Subject to any disclaimer, the term of this patent is extended or adjusted under 35 U.S.C. 154(b) by 517 days.

(21) Appl. No.: 11/373,918

(22) Filed: Mar. 13, 2006

(65) Prior Publication Data

US 2007/0211648 A1 Sep. 13, 2007

(51) Int. Cl.
*H04L 12/28* (2006.01)
(52) U.S. Cl. .................. 370/254; 370/465; 710/305
(58) Field of Classification Search .............. 370/254; 710/100–108, 120, 305, 307, 311
See application file for complete search history.

(56) References Cited

U.S. PATENT DOCUMENTS 6,230,195 B1 5/2001 Sugawara et al.

6,556,589 B2 * 4/2003 McRobert et al. .......... 370/501

FOREIGN PATENT DOCUMENTS

EP 0 905 630 A2 3/1999

* cited by examiner

*Primary Examiner*—Hassan Kizou
*Assistant Examiner*—Camquyen Thai

(57) ABSTRACT

Dynamic data path component configuration apparatus and methods are disclosed. A configuration of a data path link that is operatively coupled to a communication equipment data path is determined. A determination as to whether a configurable data path component, which is configurable to exchange data with the data path link and with another data path link, is configured compatibly with the determined configuration, is also made. If the configurable data path component is not configured compatibly with the determined configuration, then an operation to configure the configurable data path component is performed. The configuring operation could dynamically configure the data path component to increase or reduce data path speed, to bond multiple links, and/or to unbond multiple links, as electronic cards are installed or removed, for example. During the configuring operation, the configurable data path component is able to exchange data with other data path links and accordingly is non-service affecting.

16 Claims, 3 Drawing Sheets

DYNAMIC DATA PATH COMPONENT CONFIGURATION APPARATUS AND METHODS

FIELD OF THE INVENTION

This invention relates generally to communications and, in particular, to configuring internal communication equipment data paths.

BACKROUND

Data path protocols and interfaces that are currently used for data exchanges within communication equipment tend not to be flexible. Dynamic changes between different electrical speeds and bandwidths are not practical. This can present a challenge, for example, when it is desired to implement multiple input/output (I/O) electronic circuit cards having different interface types in conjunction with a common central line processing card. The multiple I/O cards might be designed for 10 Gbps, 5 Gbps, and 2.5 Gbps data path speeds, for instance.

Thus, in a high-speed line processing application, interfaces to a line processing card might be from different media with different interface speed requirements. Compounding this problem is the fact that components associated with data path interfaces are often placed on physically different printed circuit boards than components associated with a line processing card, for flexibility and re-use purposes. In addition, more and more communication equipment such as routers, particularly in the "Small Point of Presence" space, are being designed with multiple I/O cards interfacing to a single line processing card or switch fabric.

One design technique attempts to address these problems by effectively forcing higher speed technology than would otherwise be needed upon all I/O cards, including lower speed I/O cards. This approach, however, can impose significant cost burden on an equipment platform. For instance, lower speed I/O cards would require "speed down" flow control functionality as well as higher amounts of buffering for higher speed data path implementations. Cost and complexity of the lower speed I/O cards, and accordingly the equipment platform, would thereby be increased. Using lower speed I/O cards in conjunction with a higher speed data path also wastes capacity.

Other attempts have been made to solve these problems at a component level. Field Programmable Gate Arrays (FPGAs) having configurable data path transceivers are currently available. Although these transceivers could possibly be configured to support different interface speeds between multiple I/O cards and a single line processing card, transceiver configurations for all transceivers are normally dependent upon a specific FPGA program load. Changing the speed of one transceiver requires a complete new program load. The entire FPGA, including transceivers whose configurations are not being adjusted, is reset to initialize the new program load, and accordingly all data path transfers involving the FPGA are interrupted when the speed of only one of the FPGA transceivers is changed.

Since I/O cards and associated interface speed requirements can vary widely, this component-level solution is not always feasible. Every time an I/O card having a different interface speed than the predetermined speed that was chosen for a particular data path is installed in a card slot of an equipment shelf, to add a new I/O card or to replace a currently installed I/O card for example, the operation of all other I/O cards connected to the same line processing card FPGA will be affected until the FPGA has been re-loaded with a new program load.

This re-loading process also requires either operator intervention to change program loads or a software application load that bundles multiple FPGA loads and selects the correct load based on a newly inserted I/O card. In a bundled load approach, the requirement to have multiple FPGA loads can significantly increase the amount of memory needed to store the application load, as well as tax a main card processor every time a new FPGA load is required. This extra memory requirement increases the cost of the main card and thus the equipment platform. In addition, the fact that the main card processor can be busy downloading FPGAs each time an I/O card is changed occupies system resources and potentially blocks the use of other processor-intensive features.

Thus, there remains a need for improved data path configuration techniques.

SUMMARY OF THE INVENTION

Embodiments of the invention address the above issues by introducing dynamic configuration capabilities for communication equipment data path interfaces. These capabilities can avoid the need to re-load FPGAs when a card is installed in equipment, reduce the amount of memory that would otherwise be required for storing multiple FPGA loads, and also support in-service, non-data affecting changes in datapath "width" and/or rate so that inexpensive low-speed cards can be used in conjunction with an equipment data path that is also configurable for higher speeds.

According to an aspect of the invention, there is provided an apparatus that includes a configuration determining module for determining a configuration of a data path link that is operatively coupled to a data path interface of a plurality of communication equipment data path interfaces, and a data path component configuration module, operatively coupled to the configuration determining module, for determining whether a configurable data path component, which is configurable to exchange data with the data path link and with another data path link that is operatively coupled to another data path interface of the plurality of data path interfaces, is configured compatibly with the determined configuration of the data path link, for configuring the configurable data path component to exchange data with the data path link where the configurable data path component is not configured compatibly with the determined configuration, and for allowing the configurable data path component to exchange data with the other data path link during the configuring.

At least one of the configuration determining module and the configurable data path component configuration module may be implemented in software for execution by a processing element.

In some embodiments, the configurable data path component includes the data path component configuration module.

The configurable data path component may include a plurality of configurable data path links, each of the configurable data path links being configurable for exchanging data with respective data path links that are operatively coupled to data path interfaces of the plurality of data path interfaces.

The data path link and the other data path link may be data path links implemented in communication devices. In this case, the configuration determining module may be further operable to determine the configuration of the data path link by determining a type of the communication device in which the data path link is implemented.

In some embodiments, the configuration determining module is operable to determine a speed at which the data path link is configured to communicate, and the data path component configuration module is operable to determine whether the configurable data path component is configured to exchange data with the data path link at the determined speed, and, where the configurable data path component is configured to exchange data with the data path link at a speed other than the determined speed, to configure the configurable data path component to exchange data with the data path link at the determined speed, and to allow the configurable data path component to exchange data with the other data path link during the configuration.

If the configurable data path component includes a timing signal selector for selecting, from a plurality of timing signals, one timing signal for elements of the configurable data path component that are involved in exchanging data with the data path link, the data path component configuration module may be operable to configure the data path component by controlling the timing signal selector to select a different one of the timing signals for the elements of the configurable data path component that are involved in exchanging data with the data path link.

The configuration determining module may be operable to determine whether the data path link is configured to form a single logical data path with a further data path link that is operatively coupled to a further data path interface of the plurality of data path interfaces, and wherein the data path component configuration module is operable, where the data path link is configured to form a single logical data path with a further data path link, to determine whether the configurable data path component is configured to exchange data with the data path link and the further data path link as a single logical data path, and, where the configurable data path component is not configured to exchange data with the data path link and the further data path link as a single logical data path, to configure the configurable data path component to exchange data with the data path link and the further data path link as a single logical data path, and to allow the configurable data path component to exchange data with the other data path link during the configuration. These functions of the configuration determining module and the data path component configuration module may be provided instead of or in addition to the speed determining and configuration functions.

The apparatus may be implemented, for example, in communication equipment that also includes the plurality of data path interfaces operatively coupled to the configuration determining module and to the configurable data path component. The communication equipment may include an equipment shelf having a plurality of electronic card slots. The card slots may include a card slot for receiving an electronic card that comprises the data path component configuration module and the configurable data path component, and card slots comprising the plurality of data path interfaces, for receiving electronic cards that comprise one or more data path links.

A method is also provided, and includes determining a configuration of a data path link that is operatively coupled to a data path interface of a plurality of communication equipment data path interfaces, determining whether a configurable data path component, which is configurable to exchange data with the data path link and with another data path link that is operatively coupled to another data path interface of the plurality of data path interfaces, is configured compatibly with the determined configuration of the data path link, configuring the configurable data path component for exchanging data with the data path link, where the configurable data path component is not configured compatibly with the determined configuration, and maintaining a data exchange between the configurable data path component and another data path link during the configuring.

If the configurable data path component includes a plurality of configurable data path links for exchanging data with the data path links that are operatively coupled to respective data path interfaces of the plurality of data path interfaces, the operation of configuring may involve configuring the configurable data path link that is for exchanging data with the data path link that has the determined configuration.

The data path link and the other data path link may be data path links implemented in communication devices. In this case, the operation of determining a configuration may involve determining a type of the communication device in which the data path link is implemented.

In some embodiments, the operation of determining a configuration involves determining a speed at which the data path link is configured to communicate, the operation of determining whether the configurable data path component is configured compatibly with the determined configuration of the data path link involves determining whether the configurable data path component is configured to exchange data with the data path link at the determined speed, and the operation of configuring involves configuring the configurable data path component to exchange data with the data path link at the determined speed, where the configurable data path component is configured to exchange data with the data path link at a speed other than the determined speed.

Configuring the configurable data path component to exchange data with the data path link at the determined speed may involve changing a timing signal used by elements of the configurable data path component that are involved in exchanging data with the data path link.

The operation of determining a configuration may also or instead involve determining whether the data path link is configured to form a single logical data path with a further data path link that is operatively coupled to a further data path interface of the plurality of data path interfaces, the operation of determining whether the configurable data path component is configured compatibly with the determined configuration of the data path link may also or instead involve, where the data path link is configured to form a single logical data path with a further data path link, determining whether the configurable data path component is configured to exchange data with the data path link and the further data path link as a single logical data path, and the operation of configuring may also or instead involve configuring the configurable data path component to exchange data with the data path link and the further data path link as a single logical data path, where the configurable data path component is not configured to exchange data with the data path link and the further data path link as a single logical data path.

Another aspect of the invention provides an apparatus including a configuration determining module for monitoring a plurality of communication equipment data path interfaces, the configuration determining module being operable to determine a configuration of each data path link that is operatively coupled to a respective data path interface of the plurality of data path interfaces, and a data path component configuration module, operatively coupled to the configuration determining module, and operable to detect any incompatible configurations between the configurable data path component and each data path link, and to configure the configurable data path component to resolve a detected incompatible configuration while allowing the configurable data path component to exchange data with any data path links with which the configurable data path component is compatibly configured.

In some embodiments, the configuration determining module is operable to determine at least one of: a data path speed configuration parameter and a single logical data path configuration parameter. The data path component configuration module may then be operable to detect incompatible configurations of the at least one of the data path speed configuration parameter and the single logical data path configuration parameter.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
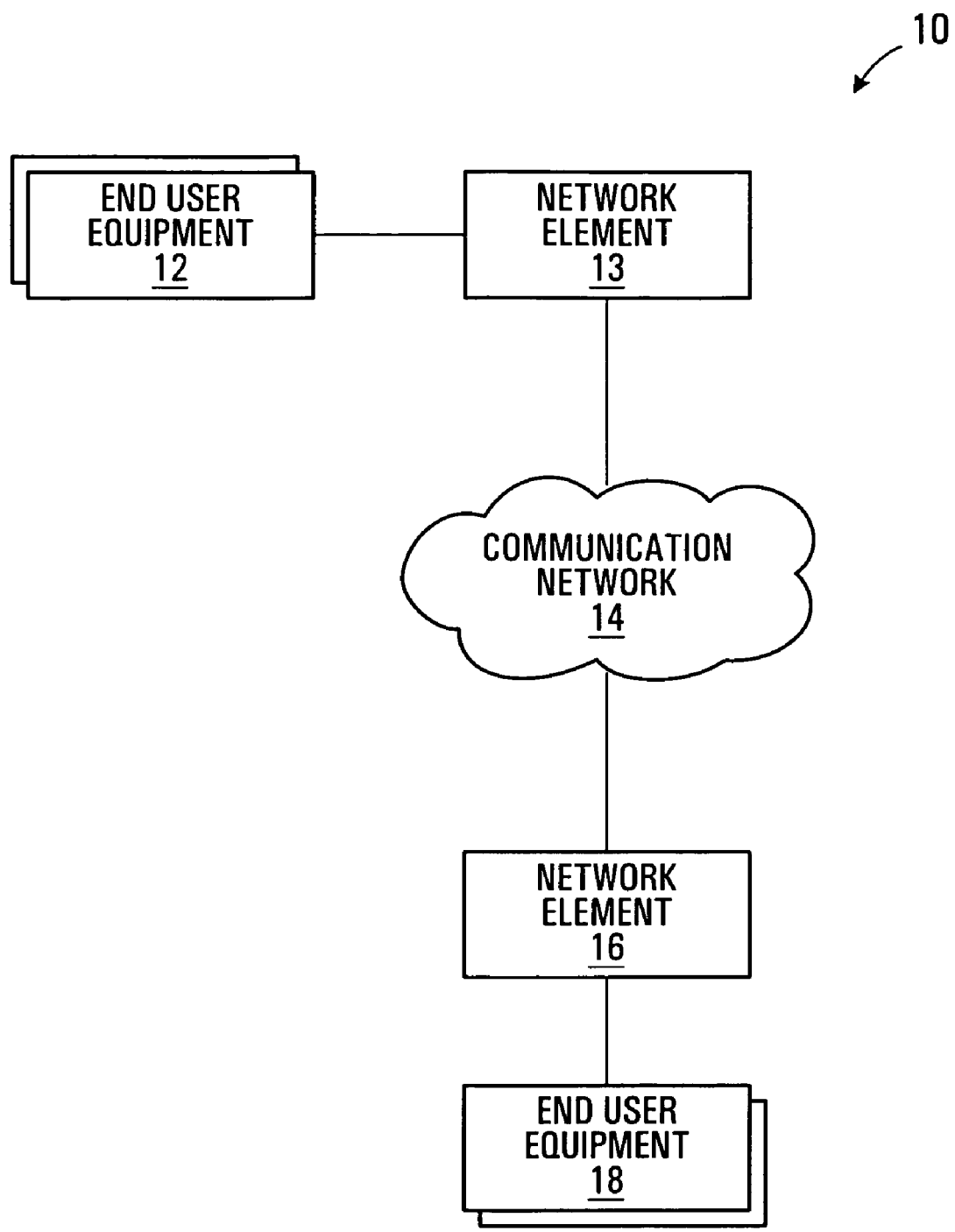
FIG. 1 is a block diagram of a communication system.

FIG. 1 is a block diagram of a communication system 10, in which some embodiments of the invention may be implemented. The communication system 10 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 in order to avoid overly complicating the drawing. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment that is configured to generate and transmit and/or to receive and terminate communication traffic. Although shown as being directly connected to the network elements 13, 16, it will be apparent that the end user equipment 12, 18 may communicate with the network elements 13, 16 through other components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14. It should be noted that, in some embodiments, the network 14 could, itself, consist of the network elements 13, 16. The network elements 13, 16 may thus be edge, core, or other types of communication equipment.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. In a particular example embodiment, the network elements 13, 16 exchange traffic with the end user communication equipment 12, 18 over Asynchronous Transfer Mode (ATM) or Synchronous Optical Network (SONET), using Packet over SONET (POS) mechanisms for instance, whereas the communication network 14 is an IP or MPLS network. However, it should be appreciated that embodiments of the invention are not limited to any particular types of communication equipment, transfer mechanisms, or protocols.

One common type of installation for communication network equipment such as the network elements 13, 16 includes an equipment rack carrying shelves that have multiple slots for receiving electronic circuit cards. The communication equipment may include hardware for supporting communications with the communication network 14 and for performing general processing of communication traffic. Electronic circuit cards such as line cards and I/O cards are then used in one or more of the slots to provide a medium- or protocol-specific interface. Using this kind of architecture, it tends to be easier to maintain spares for medium-specific modules in case of equipment failure, and substantially the same hardware core may be used in conjunction with various medium-specific modules.

In communication equipment such as the network elements 13, 16, it may be desirable to allow different types of I/O cards that have different speeds and possibly other interface requirements to be used in conjunction with the same line processing card.

As noted above, embodiments of the invention support dynamic configuration of communication equipment data path components. For example, dynamic speed changes on the same data path interface may be supported by dynamically configuring a corresponding transceiver in a line processing card FPGA depending on the configuration of an I/O card data path transceiver. This would allow lower speed I/O cards to be designed more cheaply, using cheaper FPGAs, slower speed grades, and less if any external support circuitry for speed down, for instance.

Multiple data path transceivers might also or instead be dynamically combined into a single logical channel. This allows a higher data path speed than would normally be possible, and thus can provide support for higher speed I/O cards.

Where both dynamic speed changes and dynamic logical combining are supported, a communication equipment data path can be scaled in two dimensions, specifically speed and "width". For example, a single data path transceiver might be configurable for speeds of up to 2.5 Gbps. This transceiver could then be dynamically reconfigured as necessary until I/O card speed requirements exceed 2.5 Gbps. At that point, two transceivers could be logically combined to achieve an overall speed of up to 5 Gbps through two data path interfaces. Higher speeds might be achieved in a similar manner by logically combining more than two transceivers/interfaces.

Figure 2:
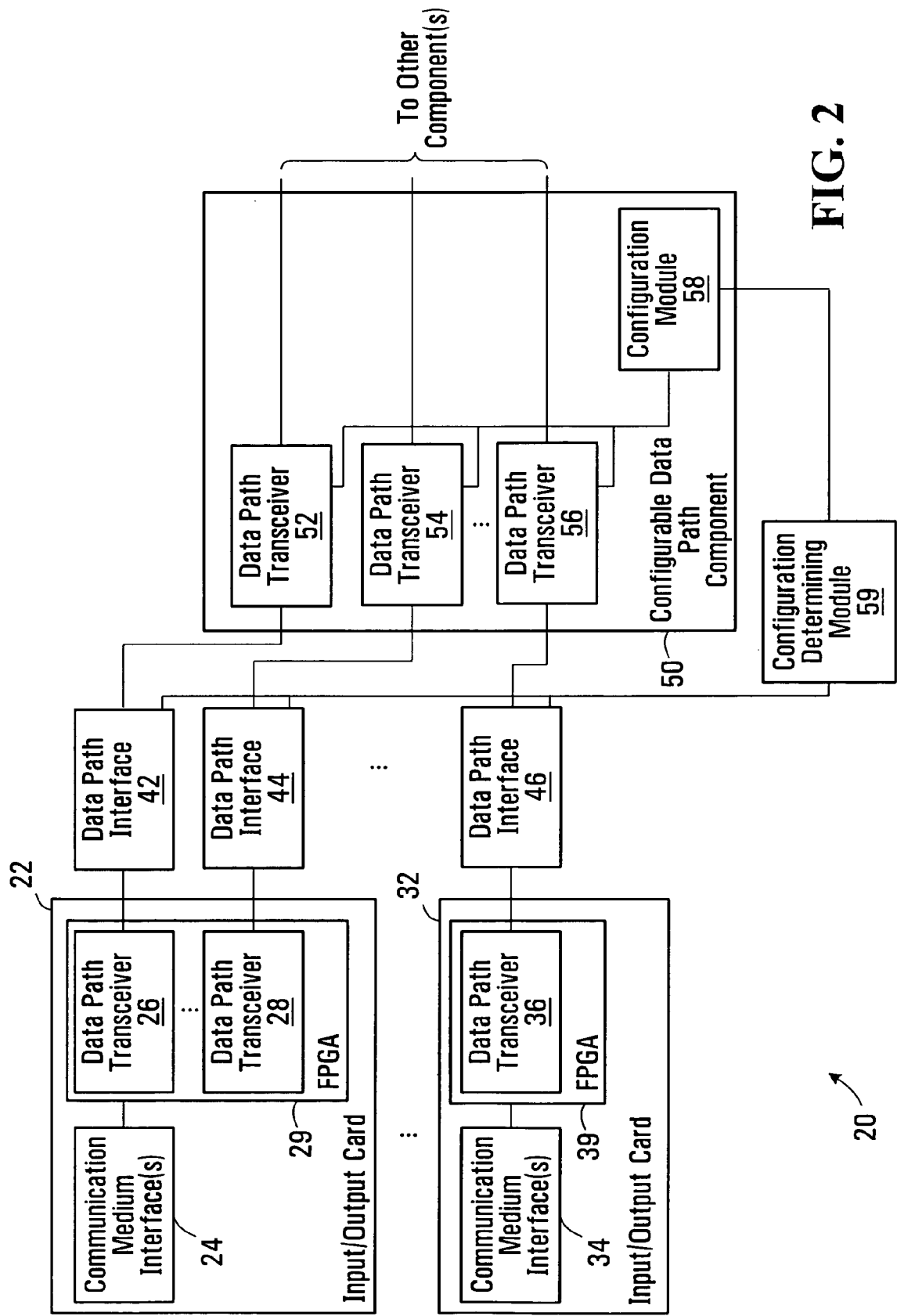
FIG. 2 is a block diagram of communication equipment.

FIG. 2 is a block diagram of communication equipment. The equipment 20 may be implemented in a network element such as the network elements 13, 16 of FIG. 1, for example.

The equipment 20 includes a plurality of communication devices, shown as I/O cards 22, 32, data path interfaces 42, 44, 46 operatively coupled to the data path transceivers 26, 28, 36 of the I/O cards 22, 32, a configurable data path component 50 operatively coupled to the data path interfaces 42, 44, 46, and a configuration determining module 59 operatively coupled to the data path interfaces 42, 44, 46. Each of the I/O cards 22, 32 includes one or more communication medium interface(s) 24, 34 and one or more data path transceivers 26, 28, 36, which are implemented using FPGAs 29, 39 in the example shown.

It should be appreciated that the particular structure shown in FIG. 2 is intended solely for the purposes of illustration, and not to limit the invention.

For example, communication equipment in which an embodiment of the invention is implemented may include more or fewer communication devices, of similar or different types, than the two I/O cards 22, 32 specifically shown. Other components might also be provided to process communication traffic that is received on or is to be transmitted through the communication medium interface(s) 24, 34. In addition, FPGA transceivers represent only one illustrative example of a type of transceiver, or more generally a type of data path link, to which the techniques disclosed herein might be applied.

The types of connections through which the components of FIG. 2 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus moreso a logical coupling than a direct physical coupling.

Referring first to the I/O cards 22, 32, the communication medium interface(s) 24, 34 provide one or more interfaces to respective communication media. These interfaces may include, for example, communication ports for connection to physical communication lines, or I/O modules for connection to components such as line cards that enable communication traffic to be exchanged with other communication devices or equipment. The interface(s) 24, 34 may thus be directly or indirectly coupled to communication media. In one embodiment, the communication medium interface(s) 24, 34 handle communication traffic of different types.

Hardware, software, firmware, or combinations thereof may be used to implement the communication medium interface(s) 24, 34. Components that may be suitable for implementing the interface(s) 24, 34 include, among others, microprocessors, microcontrollers, programmable logic devices (PLDs), FPGAs, Application Specific Integrated Circuits (ASICs), and other types of "intelligent" integrated circuits.

As shown, the data path transceivers 26, 28, 36 may be provided in FPGAs 29, 39, although other types of transceivers may instead be used in any or all communication devices deployed in communication equipment. In one embodiment, the data path transceivers 26, 28, 36 are configurable high-speed serial transceivers, and are configured to exchange data with other transceivers at a speed selected during design of the I/O cards 22, 32. Examples of such serial transceivers, other types of transceivers, and their operation will be apparent to those skilled in the art.

These data path transceivers 26, 28, 36 are illustrative of one possible implementation of data path links that may be provided on an I/O card or other communication device. Embodiments of the present invention are described herein primarily with reference to the data path transceivers 26, 28, 36, but are in no way limited to transceiver-based data path links. For example, a data path link might support only unidirectional data transfer. In this case, some sort of receiver or transmitter may be provided instead of a transceiver. References herein to data path transceivers and data path links should be interpreted accordingly.

The data path interfaces 42, 44, 46, like other components of the communication equipment 20, may be implemented using hardware, software, firmware, or some combination thereof. In some embodiments, the data path interfaces 42, 44, 46 are physical connectors through which the I/O cards access an internal data path of the communication equipment 20. Where the equipment 20 has a shelf/card-based architecture, for example, the data path interfaces 42, 44, 46 might be a card slot connector that includes contacts through which I/O card pins or conductors are coupled to midplane or backplane conductors when an I/O card 22, 32 is installed in a card slot. As those skilled in the art will appreciate, similar data path interfaces may be provided for the configurable data path component 50, but have not been shown in FIG. 2 so as to avoid further complicating the drawing.

The configurable data path component 50, another component that could be implemented in hardware, software, and/or firmware, is dynamically configurable for exchanging data with any data path transceivers 26, 28, 36 that are operatively coupled to the data path interfaces 42, 44, 46. Like the data path transceivers 26, 28, 36, the data path transceivers 52, 54, 56 may be provided in an FPGA. As noted above with reference to the data path transceivers 26, 28, 36, the data path transceivers 52, 54, 56 need not necessarily be FPGA transceivers, and represent one illustrative example of a data path link.

In accordance with an aspect of the invention, the data path transceivers 52, 54, 56 are dynamically configurable for exchanging data with respective data path transceivers that are operatively coupled to the data path interfaces 42, 44, 46. The configuration module 58, which is at least operatively coupled to the configurable data path component 50, and may be provided as part of the configurable data path component 50 as shown, provides the dynamic configuration function as described in further detail below.

According to an embodiment of the invention, the configuration determining module 59 is implemented in software for execution by a communication equipment control processor or another processor. The configurable data path component 50 may be provided on a main line processing card, for example, which has a central processor that may execute configuration determining software and other software. Some FPGAs also incorporate their own processors, and thus the configurable data path component 50 or a device used to implement that component could possibly implement the data path transceivers 52, 54, 56, the configuration module 58, and the configuration determining module 59.

In operation, the configuration determining module 59 determines a configuration of a data path transceiver 26, 28, 36, or more generally a data path link as noted above, that is operatively coupled to a data path interface 42, 44, 46. Where the data path interfaces 42, 44, 46 are card slot connectors, for example, an I/O card 22, 32 might not be installed in every card slot. As such, the configuration determining module 59 might at any time determine the configuration of one, or more than one, data path transceiver 26, 28, 36. Although in some embodiments the configuration determining module 59 determines the configuration of each data path transceiver 26, 28, 36, it should be appreciated that this function, and dynamic configuration of the configurable data path component 50, need not be supported for every data path interface 42, 44, 46 of a piece of communication equipment. For instance, certain card slots could be intended to receive only certain types of cards having specific data path requirements, whereas other card slots support multiple card types and interface requirements.

The configuration determining module 59 may determine the configuration of a data path transceiver in any of various ways. An explicit messaging mechanism, whereby the configuration determining module 59 submits a configuration query to and receives a response from a data path transceiver 26, 28, 36 through its corresponding data path interface 42, 44, 46, may be provided. According to another embodiment, the configuration determining module 59 determines a type of an I/O card 22, 32 or other communication device in which a data path transceiver is implemented, and determines the transceiver configuration based on the determined card or device type. Card or device type could be determined through a type query and response mechanism, by reading a type identifier from a predetermined location in a card or device memory when a card installation is detected during monitoring of the data path interfaces 42, 44, 46, or by otherwise providing a type identifier or indication from a card or device to the configuration determining module 59, for example. The subsequent determination of configuration based on card or device type might be supported using a type to configuration mapping table stored in a memory, or by some other means for mapping type to configuration.

Type-based configuration determination is feasible where particular types of cards or devices are configured in specific predetermined ways. However, it should be appreciated that the present invention is in no way restricted to implementation in conjunction with cards or devices that have predetermined configurations, or to type-based determination of data path transceiver configurations. Further configuration determination mechanisms are also contemplated. A user interface operatively coupled to the configuration determining module 59 would allow an operator to specify a card type or data path link configuration for a newly installed card, for example.

As noted above, the configurable data path component 50 is configurable to exchange data with the data path transceivers 26, 28, 36 that are operatively coupled to respective data path interfaces 42, 44, 46. Once the configuration determining module 59 has determined the configuration of a data path transceiver 26, 28, 36, the configuration module 58 determines whether the configurable data path component 50 is configured compatibly with the determined configuration of the data path transceiver. This compatibility determination may be made for any or all of the data path transceivers 26, 28, 36 that are operatively coupled to a data path interface 42, 44, 46 and for which the configuration determining module 59 has determined a configuration.

If the configurable data path component 50 is not configured compatibly with the determined configuration, the configuration module 58 configures the configurable data path component 50 for exchanging data with the or each data path transceiver that has an incompatible configuration, but allows the configurable data path component 50 to exchange data with one or more other data path transceivers during this configuration.

The configuration process might be most clearly illustrated by way of example. Consider a possible scenario in which the data path transceivers 52, 54 of the configurable data path component 50 are compatibly configured with their corresponding I/O card data path transceivers 26, 28, but the data path transceivers 56, 36 are configured for different speeds. In this case, and in accordance with an aspect of the invention, the configuration of the data path transceiver 56 is modified so that its speed matches the configured speed of the data path transceiver 36.

When the I/O card 32 is first installed, for example, the data path transceiver 56 might not yet be configured. It is also possible that a default configuration or a previous configuration of the data path transceiver 56 for a different I/O card is not compatible with the configuration of the data path transceiver 36. It should therefore be appreciated that configuration of the configurable data path component 50 to match the configuration of a card or device data path transceiver such as 36 may involve initially configuring or re-configuring the configurable data path component. References herein to configuring a configurable data path component should be interpreted accordingly.

According to an aspect of the invention, configuring the configurable data path component 50 in respect of one card or device data path transceiver 36, which in the example shown in FIG. 2 involves configuring one data path transceiver 56, does not affect data transfers between other data path transceivers. Thus, where the speed of the data path transceiver 56 is to be changed, the data path transceivers 26/52, 28/54 are allowed to continue exchanging data while the data path transceiver 56 is being configured.

Data path speeds are thereby dynamically configurable on a per-data path link basis. This dynamic capability is provided in one embodiment by segmenting a program load for an FPGA that is used to implement the configurable data path component 50 into distinct and separately replaceable segments. A program load segment by which a serializer/deserializer (SERDES) and other supporting logic for the data path transceiver 56 is initialized can then be loaded into the configurable data path component without affecting program load segments for the other data path transceivers 52, 54. The configuration module 58 may obtain new program load segments from a local store, in a memory of a main processing card on which the configurable data path component 50 and the configuration module 58 are implemented for instance, or possibly from a remote store. It should be noted that local storage of program load segments would occupy much less memory than a bundle of multiple entire FPGA program loads, as required in some currently available systems.

Dynamic configuration may also involve other operations than loading or re-loading a program load segment. For example, multiple timing signals for clocking the SERDES and supporting logic might be provided in or provided to the configurable data path component 50 so as to enable the data path transceivers 52, 54, 56 to be configured for any of multiple data path speeds. In this case, the configuration module 58 could control a timing signal selector for each data path transceiver 52, 54, 56 so that transceiver elements, such as a SERDES and supporting logic, that are involved in exchanging data with a card or device data path transceiver use a specific timing signal. The selectors may be dynamically controllable to select a different timing signal for each data path transceiver 52, 54, 56 to accommodate different data path speeds as card or device transceiver configurations change.

The configuration module 58 is thus operable in one embodiment to determine whether the configurable data path component 50 is configured to exchange data with the I/O card data path transceiver 36 at the configured speed of that data path transceiver, as determined by the configuration determining module 59. If the configurable data path component 50, and in particular the data path transceiver 56 in the example shown in FIG. 2, is configured to exchange data with the data path transceiver 36 at a speed other than the determined speed, then the configuration module 58 configures the configurable data path component to exchange data with the data path transceiver 36 at the determined speed. The configurable data path component 50 is able to exchange data with the other data path transceivers 26, 28 during this configuration of the data path transceiver 56.

Another configuration parameter that might also or instead be determined by the configuration determining module 59 and dynamically controlled by the configuration module 58 is whether a data path link is configured to form a single logical data path with a further data path link that is operatively coupled to a different data path interface. This may be referred to in some systems as channel bonding or interface bonding.

A determination of this logical data path status may be made using any of the mechanisms noted above in connection with data path link speed determination or a different mechanism. According to one embodiment of the invention, the configurable data path component 50 is configurable for use with I/O cards that may connect to a single card slot connector or multiple card slot connectors. In the equipment 20, the I/O card 22 is two slots wide, whereas the I/O card 32 occupies a single slot. The configuration determining module 59 may determine and compare card identifiers for the cards that are operatively coupled to each data path interface 42, 44, 46 to detect I/O cards such as the I/O card 22 that occupy multiple slots.

Multiple-slot cards may be configured to combine multiple data path transceivers/interfaces into a single logical data path. The final determination as to data path status for a multiple-slot card may involve a further operation to confirm that the card has been configured for a single logical data path. In some embodiments, the configuration determining module 59 assumes that any multiple-slot cards are configured for respective single logical data paths.

Data exchanged over multiple physical paths of a single logical data path is distributed between the physical paths by a sending transceiver and combined from the physical paths by a receiving transceiver. If the data path transceivers 26, 28 have been configured to implement a single logical path but the data path transceivers 52, 54 of the configurable data path component 50 have not, then the data path transceivers 52, 54 are compatibly configured by the configuration module 58. This configuration operation may involve establishing or changing settings of the data path transceivers 52, 54 and/or loading program load segments, for example, and does not affect the data path transceiver 56.

Inverse "un-bonding" configuration of data path transceivers might also be performed if a multiple-card slot is replaced with one or more separate cards in the same slots. Supposing that the I/O cards 22, 32 had replaced a three-slot I/O card, then the data path transceiver 56 would be configured by the configuration module 58 to effectively remove that data path transceiver from the single logical channel.

Dynamic speed configuration and dynamic single logical data path configuration may be independently implemented in embodiments of the invention. Support for both features in the same configurable data path component, however, would provide for two dimensions of dynamic data path configuration and accordingly two dimensions for scaling communication equipment.

Figure 3:
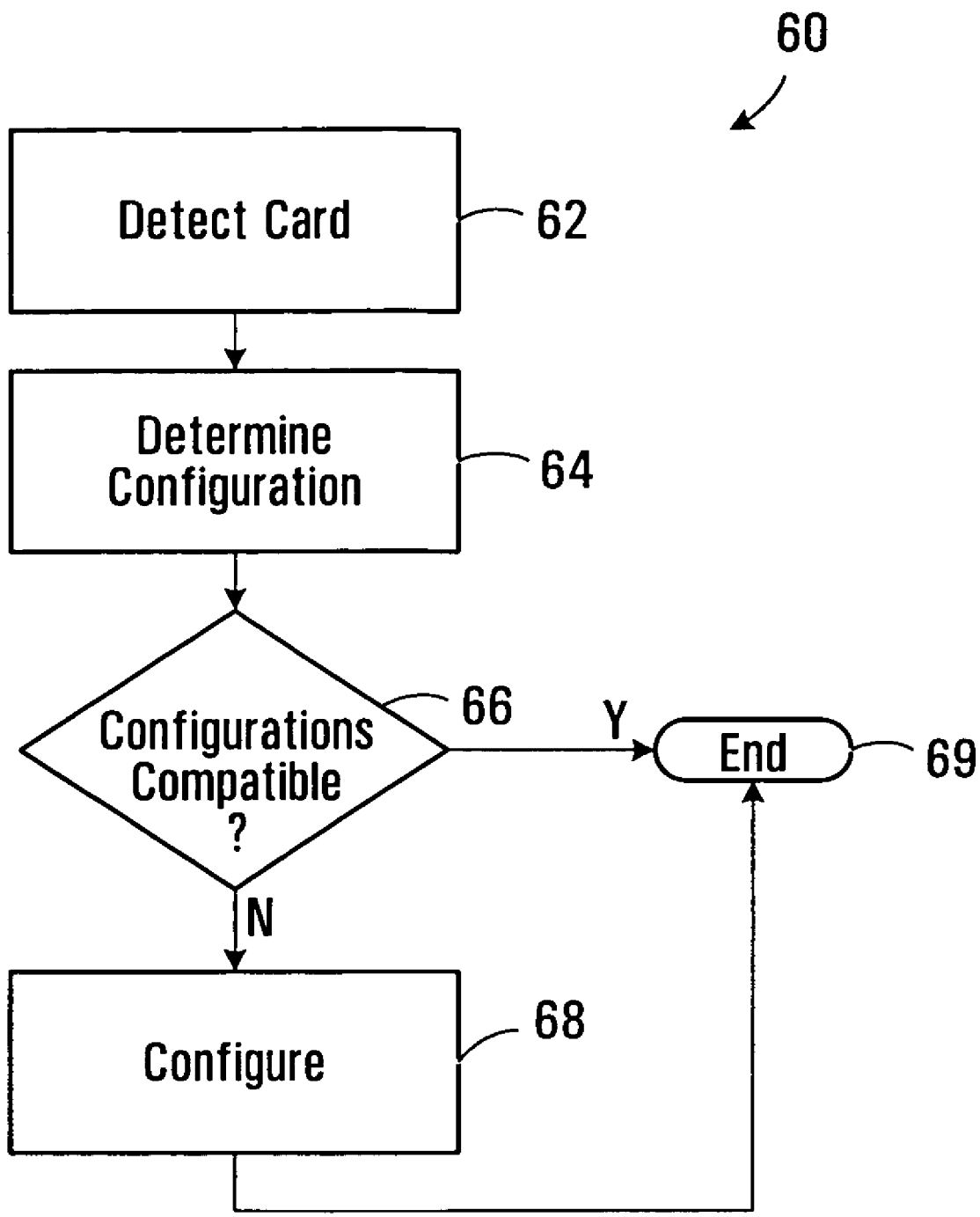
FIG. 3 is a flow diagram of a dynamic data path component configuration method.

Although described above primarily in terms of the communication equipment 20, the invention may also be implemented in other forms, illustratively as a method. FIG. 3 is a flow diagram of a dynamic data path component configuration method according to another embodiment of the invention.

The method 60 begins at 62 with detection of an electronic circuit card. This represents one example of a trigger by which a configuration determination and dynamic configuration process may be invoked. Other trigger events might include, among others, an equipment reset or an operator command for instance.

At 64, the configuration of a data path link that is operatively coupled to a data path interface is determined. This operation may be repeated for multiple data path links if more than one link has been installed.

A determination is then made at 66 as to whether a configurable data path component, which is configurable to exchange data with data path links that are operatively coupled to respective data path interfaces, is configured compatibly with the configuration(s) determined at 64. If the current configurations are compatible, then all links have been configured appropriately, and no further configuration operations are necessary. In this case, the method ends at 69, but may subsequently be repeated responsive to installation of a new card, as would be detected at 62, or some other trigger event.

Where the current configuration of the configurable data path component is not compatible with the determined configuration of a data path link, the configurable data path component is configured at 68 for exchanging data with that data path link. This configuration may resolve configuration differences for more than one data path link. However, as will be apparent from at least the foregoing description of FIG. 2, data exchange between the configurable data path component and other data path links, for which the configurable data path component is compatibly configured, is maintained during the configuring at 68.

The method 60 represents an illustrative example of a method according to one embodiment of the invention. Other embodiments may include further, fewer, or different operations, performed in a similar or different order, than explicitly shown in FIG. 3. For example, the operations of the method 60 may be performed in any of various ways. Several mechanisms for determining configurations, as well as speed and single logical data path configuration parameters, have been described above. Further variations of the method 60 may also be or become apparent to those skilled in the art.

Embodiments of the invention as disclosed herein may be used to provide more flexibility in communication equipment internal data paths than is currently available. A dynamic extension of data path configuration may allow more cost-effective circuit card and communication equipment design by not restricting a data path to a specific fixed speed between data path links.

What has been described is merely illustrative of the application of principles of embodiments of the invention. Other arrangements and methods can be implemented by those skilled in the art without departing from the scope of the present invention.

For example, the particular division of functions as shown in FIG. 2 is intended solely for the purposes of illustration. The present invention is not limited to any particular physical implementation or division of function. Other embodiments may implement the functions disclosed herein using fewer or further components interconnected in a similar or different manner than explicitly shown.

In addition, although described primarily in the context of systems and methods, other implementations of the invention are also contemplated, as instructions stored on a machine-readable medium for instance.

We claim:

1. An apparatus comprising:
   a configuration determining module for determining a configuration of a data path link that is operatively coupled to a data path interface of a plurality of communication equipment data path interfaces; and a data path component configuration module, operatively coupled to the configuration determining module, for determining whether a configurable data path component, which is configurable to exchange data with the data path link and with another data path link that is operatively coupled to another data path interface of the plurality of data path interfaces, is configured compatibly with the determined configuration of the data path link, for configuring the configurable data path component to exchange data with the data path link where the configurable data path component is not configured compatibly with the determined configuration, and for allowing the configurable data path component to exchange data with the other data path link during the configuring, wherein the configuration determining module determines whether the data path link is bonded to form a single logical data path with a further data path link that is operatively coupled to a further data path interface of the plurality of data path interfaces, wherein, where the data path link is bonded to form a single logical data path with a further data path link, the data path component configuration module determines whether the configurable data path component is configured to exchange data with the data path link and the further data path link as a single logical data path, and wherein, where the configurable data path component is not configured to exchange data with the data path link and the further data path link as a single logical data path, the data path component configuration module configures the configurable data path component to exchange data with the data path link and the further data path link as a single logical data path, and allows the configurable data path component to exchange data with the other data path link during the configuration.

2. The apparatus of claim 1, wherein at least one of the configuration determining module and the configurable data path component configuration module is implemented in software for execution by a processing element.

3. The apparatus of claim 1, wherein the configurable data path component comprises the data path component configuration module.

4. The apparatus of claim 1, wherein the configurable data path component comprises a plurality of configurable data path links, each of the configurable data path links being configurable for exchanging data with respective data path links that are operatively coupled to data path interfaces of the plurality of data path interfaces.

5. The apparatus of claim 1, wherein the data path link and the other data path link comprise data path links implemented in communication devices, and wherein the configuration determining module determines the configuration of the data path link by determining a type of the communication device in which the data path link is implemented.

6. The apparatus of claim 1, wherein the configuration determining module determines a speed at which the data path link is configured to communicate, and wherein the data path component configuration module determines whether the configurable data path component is configured to exchange data with the data path link at the determined speed, and, where the configurable data path component is configured to exchange data with the data path link at a speed other than the determined speed, configures the configurable data path component to exchange data with the data path link at the determined speed, and allows the configurable data path component to exchange data with the other data path link during the configuration.

7. The apparatus of claim 6, wherein the configurable data path component comprises a timing signal selector for selecting, from a plurality of timing signals, one timing signal for elements of the configurable data path component that are involved in exchanging data with the data path link, and wherein the data path component configuration module configures the data path component by controlling the timing signal selector to select a different one of the timing signals for the elements of the configurable data path component that are involved in exchanging data with the data path link.

8. Communication equipment comprising:
   the apparatus of claim 1; and
   the plurality of data path interfaces, operatively coupled to the configuration determining module and to the configurable data path component.

9. The communication equipment of claim 8, wherein the communication equipment comprises an equipment shelf having a plurality of electronic card slots, the plurality of electronic card slots comprising an electronic card slot for receiving an electronic card that comprises the data path component configuration module and the configurable data path component, and electronic card slots comprising the plurality of data path interfaces, for receiving electronic cards that comprise one or more data path links.

10. A method comprising:
   determining a configuration of a data path link that is operatively coupled to a data path interface of a plurality of communication equipment data path interfaces;
   determining whether a configurable data path component, which is configurable to exchange data with the data path link and with another data path link that is operatively coupled to another data path interface of the plurality of data path interfaces, is configured compatibly with the determined configuration of the data path link;
   configuring the configurable data path component for exchanging data with the data path link, where the configurable data path component is not configured compatibly with the determined configuration; and
   maintaining a data exchange between the configurable data path component and another data path link during the configuring,
   wherein determining a configuration comprises determining whether the data path link is bonded to form a single logical data path with a further data path link that is operatively coupled to a further data path interface of the plurality of data path interfaces,
   wherein determining whether the configurable data path component is configured compatibly with the determined configuration of the data path link comprises, where the data path link is bonded to form a single logical data path with a further data path link, determining whether the configurable data path component is configured to exchange data with the data path link and the further data path link as a single logical data path, and
   wherein configuring comprises configuring the configurable data path component to exchange data with the data path link and the further data path link as a single logical data path, where the configurable data path component is not configured to exchange data with the data path link and the further data path link as a single logical data path.

11. The method of claim 10, wherein the configurable data path component comprises a plurality of configurable data path links for exchanging data with the data path links that are operatively coupled to respective data path interfaces of the plurality of data path interfaces, and wherein configuring comprises configuring the configurable data path link that is for exchanging data with the data path link that has the determined configuration.

12. The method of claim 10 wherein the data path link and the other data path link comprise data path links implemented in communication devices, and wherein determining a configuration comprises determining a type of the communication device in which the data path link is implemented.

13. The method of claim 10,
wherein determining a configuration further comprises determining a speed at which the data path link is configured to communicate,
wherein determining whether the configurable data path component is configured compatibly with the determined configuration of the data path link further comprises determining whether the configurable data path component is configured to exchange data with the data path link at the determined speed, and
wherein configuring further comprises configuring the configurable data path component to exchange data with the data path link at the determined speed, where the configurable data path component is configured to exchange data with the data path link at a speed other than the determined speed.

14. The method of claim 13, wherein configuring the configurable data path component to exchange data with the data path link at the determined speed comprises changing a timing signal used by elements of the configurable data path component that are involved in exchanging data with the data path link.

15. An apparatus comprising:
a configuration determining module for monitoring a plurality of communication equipment data path interfaces, the configuration determining module being operable to determine a configuration of each data path link of a plurality of data path links respectively operatively coupled to the plurality of data path interfaces; and
a data path component configuration module, operatively coupled to the configuration determining module, and operable to detect any incompatible configurations between the plurality of data path links and a plurality of transceivers of a configurable data path component Field Programmable Gate Array (FPGA) respectively operatively coupled to the data path links, and to configure an FPGA transceiver of the configurable data path component to resolve a detected incompatible configuration between the FPGA transceiver and the data path link to which it is operatively coupled while allowing the FPGA transceivers of the configurable data path component to exchange data with any data path links with which the FPGA transceivers of the configurable data path component are compatibly configured.

16. The apparatus of claim 15, wherein the configuration determining module determines at least one of: a data path speed configuration parameter and a single logical data path configuration parameter, and wherein the data path component configuration module detects incompatible configurations of the at least one of the data path speed configuration parameter and the single logical data path configuration parameter.

* * * * *

UNITED STATES PATENT AND TRADEMARK OFFICE
CERTIFICATE OF CORRECTION

PATENT NO. : 7,586,854 B2 Page 1 of 1
APPLICATION NO. : 11/373918
DATED : September 8, 2009
INVENTOR(S) : Megarity et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Twenty-first Day of September, 2010

David J. Kappos
*Director of the United States Patent and Trademark Office*